United States Patent
Maqbool

(10) Patent No.: US 12,189,892 B2
(45) Date of Patent: Jan. 7, 2025

(54) METHOD AND APPARATUS FOR SEPARATING TOUCHES FROM MERGED TOUCH DATA IN CAPACITIVE TOUCH SCREENS

(71) Applicant: Microchip Touch Solutions Limited, Berkshire (GB)

(72) Inventor: Shazia Maqbool, Southampton (GB)

(73) Assignee: Microchip Touch Solutions Limited (GB)

( * ) Notice: Subject to any disclaimer, the term of this patent is extended or adjusted under 35 U.S.C. 154(b) by 0 days.

(21) Appl. No.: 18/421,725

(22) Filed: Jan. 24, 2024

(65) Prior Publication Data
US 2024/0256080 A1    Aug. 1, 2024

Related U.S. Application Data

(60) Provisional application No. 63/441,323, filed on Jan. 26, 2023.

(51) Int. Cl.
*G06F 3/041*    (2006.01)
*G06F 3/044*    (2006.01)

(52) U.S. Cl.
CPC .......... *G06F 3/04166* (2019.05); *G06F 3/044* (2013.01)

(58) Field of Classification Search
None
See application file for complete search history.

(56) References Cited

U.S. PATENT DOCUMENTS

| | | | |
|---|---|---|---|
| 11,526,237 B1* | 12/2022 | Lim | G06F 3/04186 |
| 2013/0169561 A1* | 7/2013 | Park | G06F 3/04186 345/173 |
| 2015/0378497 A1 | 12/2015 | Ningrat et al. | |

FOREIGN PATENT DOCUMENTS

WO    WO2019014858 A1    1/2019

OTHER PUBLICATIONS

International Search Report and Written Opinion, May 23, 2024, PCT/US24/012954, International Searching Authority, European Patent Office.

* cited by examiner

*Primary Examiner* — Stephen T. Reed
(74) *Attorney, Agent, or Firm* — Burr & Forman LLP; Ryan M. Corbett

(57) ABSTRACT

A method of detecting an application or removal of one of a first touch and a second touch on a capacitive touch screen is provided. The method may include storing respective first touch data for a first set of nodes at a first cycle, storing respective second touch data for a second set of nodes at a second cycle after the first cycle, determining a first total touch data by summing the respective first touch data for the first set of nodes at the first cycle, determining a second total touch data by summing the respective second touch data for the second set of nodes at the second cycle, and determining whether a touch has been applied or removed from the capacitive touch screen based on a comparison between the first total touch data and the second total touch data.

19 Claims, 17 Drawing Sheets

Second touch dropped.
Two touches are so close
They appear as one touch

| X↓/Y→ | 3 | 4 | 5 | 6 |
|---|---|---|---|---|
| 7 | 0 | 25 | 48 | 6 |
| 8 | 7 | 192 | 255 | 37 |
| 9 | 3 | 85 | 158 | 16 |
| 10 |  | 2 | 4 |  |

| X↓/Y→ | 3 | 4 | 5 | 6 | 7 |
|---|---|---|---|---|---|
| 6 | | | 0 | | |
| 7 | 3 | 30 | 53 | 10 | |
| 8 | 13 | 204 | 255 | 26 | 2 |
| 9 | 16 | 181 | 255 | 43 | 2 |
| 10 | 13 | 204 | 255 | 46 | 2 |
| 11 | 3 | 30 | 53 | 10 | |

FIG. 4

METHOD AND APPARATUS FOR SEPARATING TOUCHES FROM MERGED TOUCH DATA IN CAPACITIVE TOUCH SCREENS

CROSS-REFERENCE TO RELATED APPLICATION

The present application claims priority to U.S. Provisional Patent Application No. 63/441,323, filed on Jan. 26, 2023, the contents of which are hereby incorporated by reference in their entirety.

TECHNICAL FIELD

The present disclosure relates generally to capacitive touch screens, and more specifically to distinguishing between multiple touches occurring in close physical proximity on capacitive touch screens.

SUMMARY

According to an aspect of one or more examples, there is provided a method of distinguishing between touches on a capacitive touch screen. The method may include storing respective first touch data for a first set of nodes at a first cycle, determining a first total touch data by summing the respective first touch data for the first set of nodes at the first cycle; storing respective second touch data for a second set of nodes at a second cycle after the first cycle, wherein the first set of nodes and the second set of nodes at least partially overlap, allocating nodes for which first touch data was stored at the first cycle to a first touch, allocating nodes for which second touch data was stored at the second cycle, but for which first touch data was not stored at the first cycle, to a second touch, determining, for one or more boundary nodes of the first set of nodes allocated to the first touch that are adjacent to a node allocated to the second touch, whether the second touch data of the respective one or more boundary nodes is greater than the first touch data of the respective one or more boundary nodes, re-allocating one or more of the respective boundary nodes to the second touch based on the second touch data of the respective one or more boundary nodes being greater than the first touch data of the respective one or more boundary nodes, identifying one or more isolated nodes allocated to the second touch that are adjacent to at least one other node allocated to the first touch, and not adjacent to any other nodes allocated to the second touch, and re-allocating the one or more identified isolated nodes to the first touch, after the one or more isolated nodes is reallocated to the first touch, and after the one or more boundary nodes is re-allocated to the second touch, determining a second total touch data by summing respective second touch data from the second cycle for nodes allocated to the first touch, comparing the first total touch data to the second total touch data, and identifying joint boundary nodes based on the comparison of the first total touch data to the second total touch data.

The step of identifying joint boundary nodes may include, in response to the second total touch data exceeding the first total touch data by a threshold, identifying one or more nodes allocated to the first touch that are adjacent to a node allocated to the second touch as the joint boundary nodes.

The step of identifying joint boundary nodes may include, in response to the second total touch data not exceeding the first total touch data by a threshold, identifying one or more nodes allocated to the second touch that are adjacent to a node allocated to the first touch as the joint boundary nodes.

The step of re-allocating one or more of the boundary nodes may include determining a first touch data average of the first touch data for the first set of nodes at the first cycle, comparing respective second touch data stored at the second cycle for the respective one or more boundary nodes to the first touch data average, and re-allocating to the second touch one or more boundary nodes having first touch data that is less than the first touch data average and second touch data that is greater than the first touch data average.

The step of re-allocating one or more of the boundary nodes may include determining whether the respective second touch data of the one or more boundary nodes exceeds the respective first touch data of the respective one or more boundary nodes by more than a threshold, and re-allocating to the second touch one or more boundary nodes having second touch data that exceeds the respective first touch data average by more than the threshold. The first touch data and the second touch data comprise at least one of capacitive touch distribution, location and amplitude According to another aspect of various examples, there is provided a method of detecting an application or removal of one of a first touch and a second touch on a capacitive touch screen. The method may include storing respective first touch data for a first set of nodes at a first cycle, storing respective second touch data for a second set of nodes at a second cycle after the first cycle, determining a first total touch data by summing the respective first touch data for the first set of nodes at the first cycle, determining a second total touch data by summing the respective second touch data for the second set of nodes at the second cycle, and determining whether a touch has been applied or removed from the capacitive touch screen based on a comparison between the first total touch data and the second total touch data.

In response to the second total touch data divided by the first total touch data exceeding a threshold, the method may determine that a touch has been applied to the capacitive touch screen. In response to the first total touch data divided by the second total touch data exceeding a threshold, the method may determine that a touch has been removed from the capacitive touch screen.

According to an aspect of various examples, there is provided a method of distinguishing between touches on a capacitive touch screen. The method may include storing respective first touch data for a first set of nodes of the capacitive touch screen at a first cycle, wherein the first set of nodes are allocated to a first touch, storing respective second touch data for a second set of nodes of the capacitive touch screen at a first cycle, wherein the second set of nodes are allocated to a second touch, identifying as shared nodes of the first cycle, nodes of the capacitive touch screen allocated to the first touch and the second touch, storing respective touch data for a combined set of nodes of the capacitive touch screen at a second cycle, wherein the combined set of nodes at least partially overlaps at least one of the first set of nodes and the second set of nodes, allocating nodes of the combined set of nodes that overlap with the first set of nodes at the first cycle to the first touch, allocating nodes of the combined set of nodes that overlap with the second set of nodes at the first cycle to the second touch, and identifying as shared nodes of the second cycle, nodes of the combined set of nodes that overlap with the shared nodes of the first cycle.

The method may include allocating nodes of the combined set of nodes that do not overlap with the first set of nodes at the first cycle or the second set of nodes at the first cycle, but are adjacent to one or more nodes of the first set of nodes at the first cycle, to the first touch, and allocating nodes of the combined set of nodes that do not overlap with the first set of nodes or the second set of nodes at the first cycle, but are adjacent to one or more nodes of the second set of nodes, to the second touch.

The method may include determining a first cycle total by summing the respective first touch data for the respective first set of nodes at the first cycle and the respective second touch data for the respective second set of nodes at the first cycle, determining a second cycle total by summing the respective touch data for a combined set of nodes of the capacitive touch screen at a second cycle, comparing the first cycle total to the second cycle total, and determining that one of the first touch and the second touch has been removed, in response to the second cycle total being less than the first cycle total.

According to an aspect of various examples, there is provided an apparatus to distinguish between touches on a capacitive touch screen. The apparatus may include a capacitive touch screen having a plurality of nodes to output respective touch data in response to being touched by a user, a memory unit coupled to the capacitive touch screen, and processing circuitry to: store, in the memory unit, respective first touch data for a first set of nodes of the plurality of nodes at a first cycle, determine a first total touch data by summing the respective first touch data for the first set of nodes at the first cycle, store, in the memory unit, respective second touch data for a second set of nodes of the plurality of nodes at a second cycle after the first cycle, wherein the first set of nodes and the second set of nodes at least partially overlap, allocate nodes for which first touch data was stored at the first cycle to a first touch, allocate nodes for which second touch data was stored at the second cycle, but for which first touch data was not stored at the first cycle, to a second touch, determine, for one or more boundary nodes of the first set of nodes allocated to the first touch that are adjacent to a node allocated to the second touch, whether the second touch data of the respective one or more boundary nodes is greater than the first touch data of the respective one or more boundary nodes, re-allocate one or more of the respective boundary nodes to the second touch based on the second touch data of the respective one or more boundary nodes being greater than the first touch data of the respective one or more boundary nodes, identify one or more isolated nodes allocated to the second touch that are adjacent to at least one other node allocated to the first touch, and not adjacent to any other nodes allocated to the second touch, re-allocate the one or more identified isolated nodes to the first touch, after the one or more isolated nodes is reallocated to the first touch, and after the one or more boundary nodes is re-allocated to the second touch, determine a second total touch data by summing respective second touch data from the second cycle for nodes allocated to the first touch, compare the first total touch data to the second total touch data, and identify joint boundary nodes based on the comparison of the first total touch data to the second total touch data.

To identify the joint boundary nodes, in response to the second total touch data exceeding the first total touch data by a threshold, the processing circuitry is to identify one or more nodes allocated to the first touch that are adjacent to a node allocated to the second touch as the joint boundary nodes.

To identify the joint boundary nodes, in response to the second total touch data not exceeding the first total touch data by a threshold, the processing circuitry is to identify one or more nodes allocated to the second touch that are adjacent to a node allocated to the first touch as the joint boundary nodes.

To re-allocate the one or more boundary nodes, the processing circuitry is to: determine a first touch data average of the first touch data for the first set of nodes at the first cycle, compare respective second touch data stored at the second cycle for the respective one or more boundary nodes to the first touch data average, and re-allocate to the second touch one or more boundary nodes having second touch data that is greater than the first touch data average.

To re-allocate the one or more boundary nodes, the processing circuitry is to: determine whether the respective second touch data of the one or more boundary nodes exceeds the respective first touch data of the respective one or more boundary nodes by more than a threshold, and re-allocate to the second touch one or more boundary nodes having second touch data that exceeds the respective first touch data average by more than the threshold.

BRIEF DESCRIPTION OF DRAWINGS

FIG. 2B shows capacitive touch data stored at a first cycle according to various examples.

FIG. 4 shows a method of allocating nodes of a capacitive touch screen to first and second touches based on capacitive touch data according to various examples.

DETAILED DESCRIPTION OF VARIOUS EXAMPLES

Figure 1A:
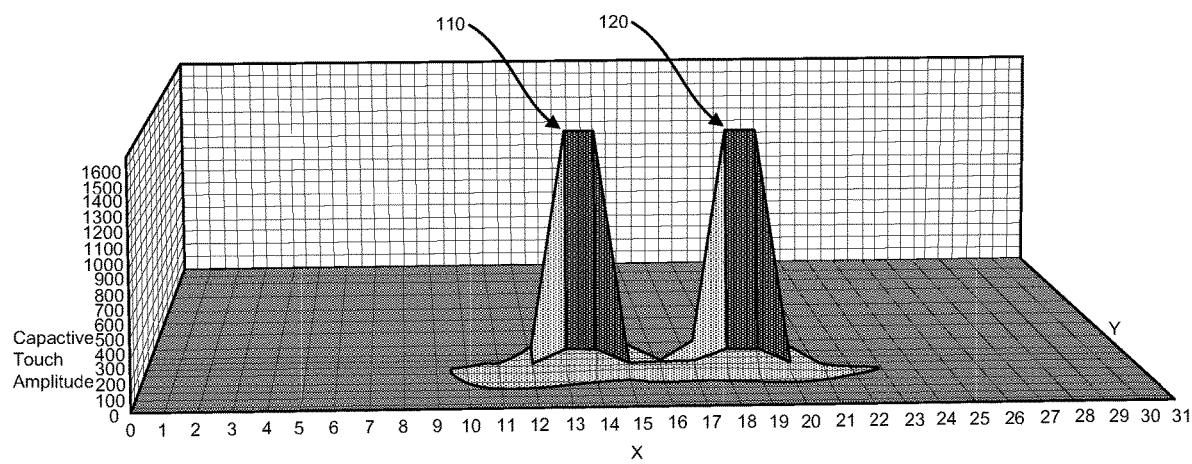
FIG. 1A shows a graphical representation of capacitive touch data according to the prior art.

Reference will now be made in detail to the following various examples, which are illustrated in the accompanying drawings, wherein like reference numerals refer to like elements throughout. The following examples may be embodied in various forms without being limited to the examples set forth herein.

FIG. 1A shows a graphical representation of capacitive touch data according to the prior art. Capacitive touch screens have become ubiquitous, and are used in various applications including cellular phones, tablets, and control panels used for various applications such as in automobiles and point of sale terminals, without limitation. Capacitive touch screens are divided into many nodes, which may be square or rectangular in shape (though other shapes may be used). When a user touches a capacitive touch screen or comes within close enough proximity to the capacitive touch screen, a capacitive touch controller measures a capacitive touch amplitude at each of the nodes that are touched. The present application describes the use of capacitive touch amplitude, but other types of touch data may be used to identify touches. The capacitive touch amplitude depends on how much of the node is touched by the user. If the user's finger touches the entire the node, the capacitive touch amplitude will be greater than the capacitive touch amplitude for a node that is only partially touched by the user's finger. Referring to FIG. 1A, the x-axis and y-axis represent the capacitive touch screen, and the nodes of the capacitive touch screen. The vertical axis illustrates the capacitive touch amplitude at a given node in the x-y plane. As shown in FIG. 1A, two separate touches of the capacitive touch screen, a first touch 110 and a second touch 120, have been detected, as indicated by the two peaks of capacitive touch amplitude.

Figure 1B:
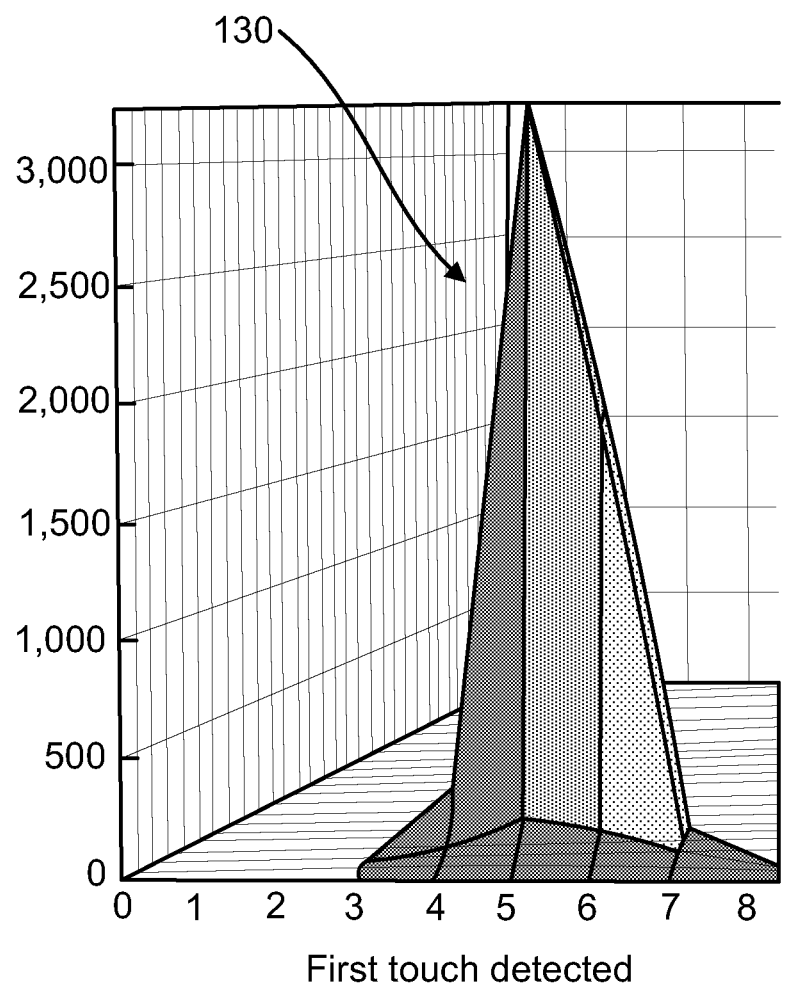
FIG. 1B shows a graphical representation of capacitive touch data of a first touch according to the prior art.
Figure 1C:
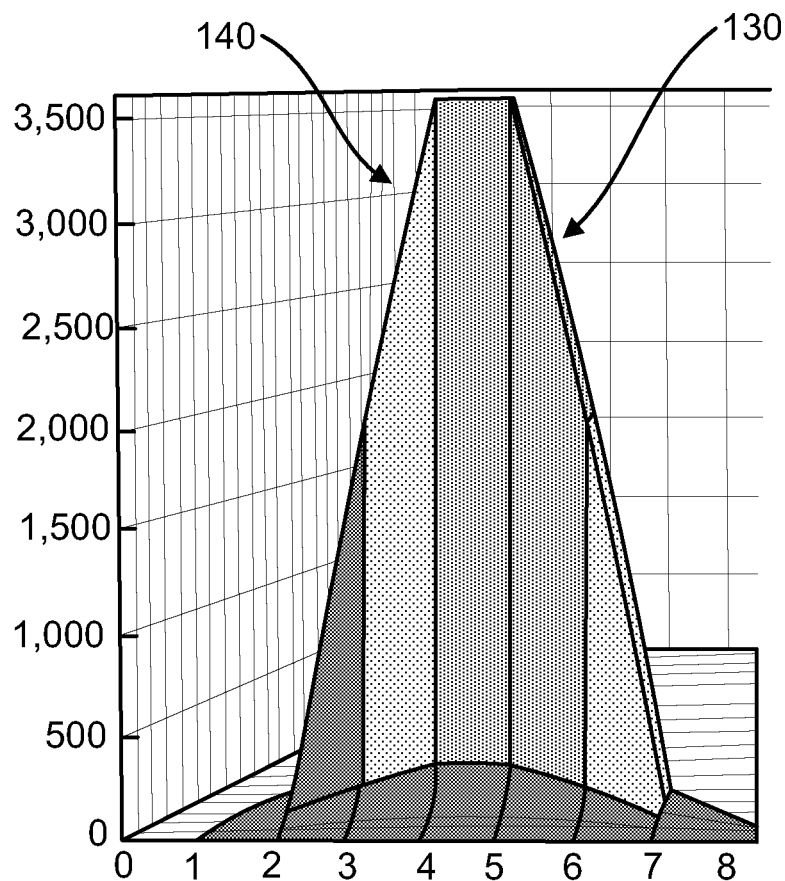
FIG. 1C shows a graphical representation of capacitive touch data of a first touch and a second touch that have been merged according to the prior art.

FIG. 1B shows a graphical representation of capacitive touch data according to the prior art. Referring to FIG. 1B, a first touch 130 of the capacitive touch screen is shown, as indicated by the single peak in the capacitive touch amplitude. Referring to FIG. 1C the capacitive touch amplitude of the first touch 130 and of a second touch 140 that occurs very close to the first touch 130, is shown. Because the second touch 140 is so close to the first touch 130, the two capacitive touch amplitude peaks merge into a single peak, making it difficult to distinguish between the first touch 130 and the second touch 140. When this occurs, the position of the two touches may merge into a single position that is between the two touches, which causes the first touch 130 to "jump" toward the second touch 140. This may also occur during a "pinch" operation, in which the user may move one finger toward a second finger in a pinching motion. As the first finger gets very close to the second finger, the two touches may merge, resulting in inaccurate detection of the touches. Moreover, the capacitive touch controller may assign touch IDs to each touch that is detected. When two touches merge, although the touches may appear merged on the touch screen, the software or firmware that assigns the touch IDs may maintain the separate touch IDs for the two touches. If the user removes one of the touches, because the two touches are merged, the software or firmware may not be able to detect the removed touch. In that case, when a new touch is detected, a new touch ID is assigned to the new touch, while the prior touch ID is still reserved for a touch that has been removed. Accordingly, there is a need for detecting and distinguishing between multiple touches occurring close together on a capacitive touch screen.

Figure 2A:
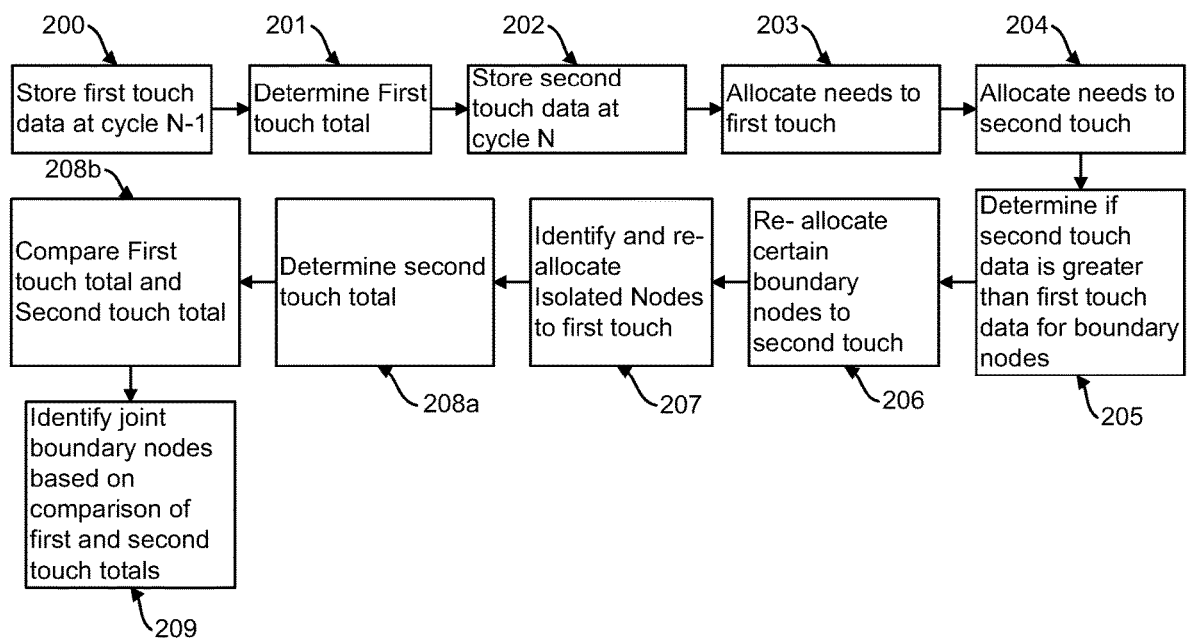
FIG. 2A shows a method of distinguishing between touches on a capacitive touch screen according to various examples.

FIGS. 2A-8 show a method of distinguishing between touches on a capacitive touch screen according to various examples. The description below references "touches" of the capacitive screen, which includes a user physically touching the capacitive touch screen and a user coming within close enough proximity to the capacitive touch screen to register touch screen data, even if the user is not physically touching the capacitive touch screen. FIG. 2A shows a method of distinguishing between touches on a capacitive touch screen according to various examples. FIG. 2B shows a step of storing capacitive touch data during a first cycle according to various examples. The capacitive touch controller stores touch data at regular time intervals or cycles. In step 200, during a first cycle, N−1, respective first touch data 210 is stored for a first set of nodes. Specifically, in FIG. 2B, the capacitive touch amplitude is stored for nodes ranging in the x-direction from 7 to 10, and in the y-direction ranging from 3 to 6. According to various examples, in step 201 a first total touch data may be determined by summing the respective first touch data for all of the nodes in the first set of nodes. According to various examples, a first touch data average may be determined by calculating the sum of the capacitive touch amplitudes for all of the nodes in the first set of nodes, and dividing the sum by the number of nodes for which the first of touch data was recorded. In the example shown in FIG. 2B, the first total touch data is 838, and the first touch data average is 60.

Figure 3:
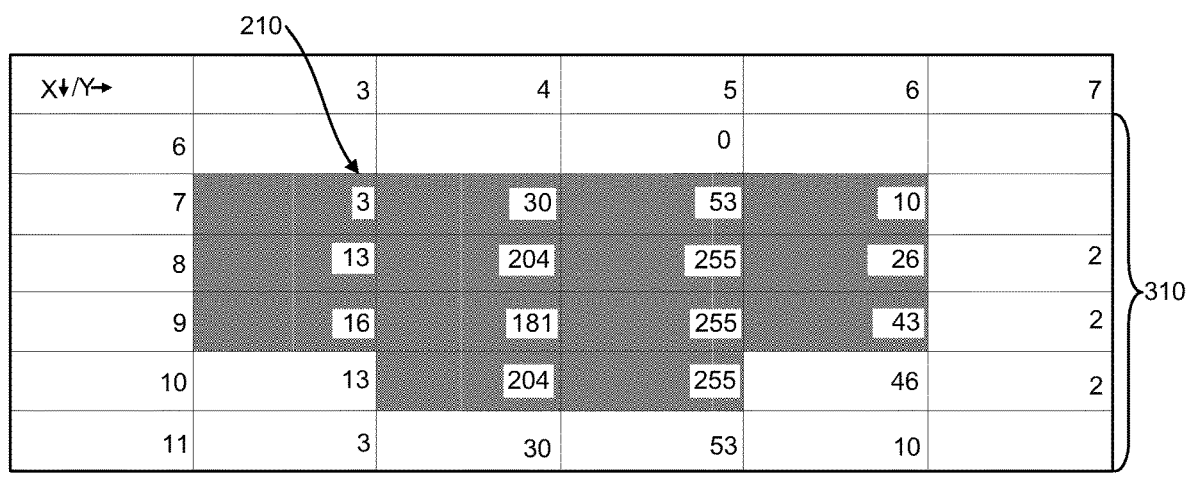
FIG. 3 shows capacitive touch data stored at a second cycle according to various examples.

In step 202, capacitive touch data is stored during a second cycle, N, according to various examples. The capacitive touch data shown in FIG. 3 is second touch data 310 from a second touch that occurs during the second cycle N for a second set of nodes, however, the second touch occurs at many of the same nodes as the first touch, whose touch data is shown in FIG. 2B. The nodes for which second touch data was stored ranges from 6 to 11 in the x-direction, and from 3-7 in the y-direction. As shown by comparing FIGS. 2B and 3, the capacitive touch amplitude increased for some nodes, and decreased for other nodes, from cycle N−1 to cycle N.

In steps 203 and 204, nodes of a capacitive touch screen are respectively allocated to first and second touches based on capacitive touch data according to various examples. Referring to FIG. 4, the outline or profile of the of the nodes for which first touch data was stored during cycle N−1 is overlapped with the second touch data for the second cycle, i.e. for cycle N. All nodes for which first touch data 210 was stored for cycle N−1 are allocated to a first touch. All other nodes for which second touch data 310 was stored during cycle N, but for which touch data was not stored during the cycle N−1, are allocated to a second touch.

Figure 5:
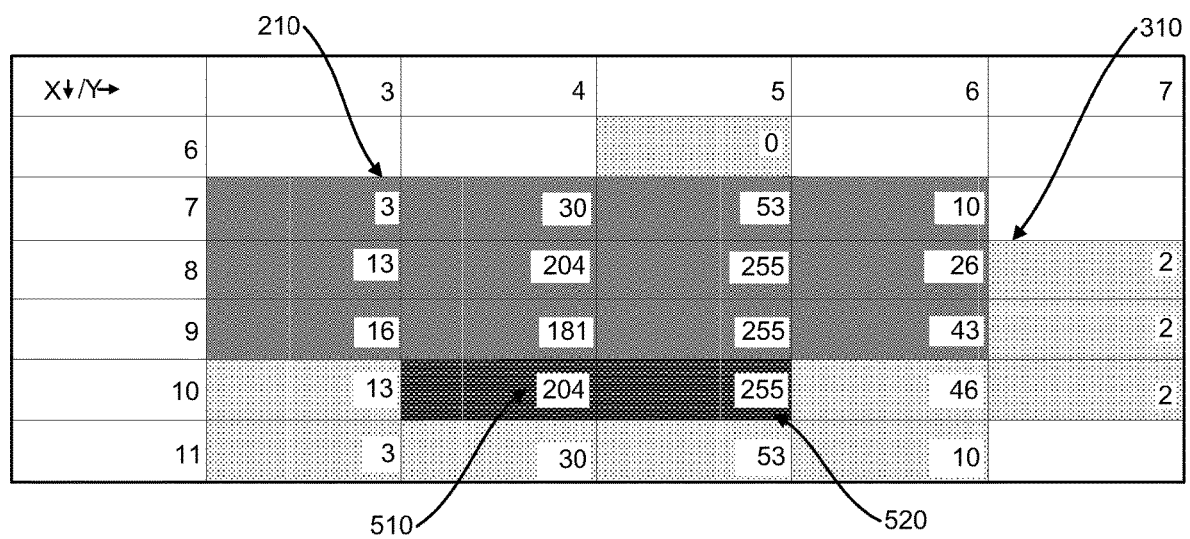
FIG. 5 shows a method of re-allocating boundary nodes of a capacitive touch screen between first and second touches based on capacitive touch data according to various examples.

In step 205, it is determined whether the second touch data is greater than the first touch data for one or more boundary nodes. In step 206, one or more boundary nodes that were allocated to the first touch are re-allocated to the second touch based on the second touch data being of the respective one or more boundary nodes being greater than the first touch data of the respective one or more boundary nodes. FIG. 5 shows a step of re-allocating boundary nodes allocated to the first touch to the second touch, according to various examples. Referring briefly back to FIG. 2B, it can be seen that the first touch data (e.g., capacitive touch amplitude) for each boundary node i.e., the nodes forming the perimeter of the area for which first touch data was stored, at the cycle N−1, are all below the average capacitive touch amplitude of 60. As shown in FIGS. 3, 4, and 5, during the cycle N, two of the boundary nodes 510, 520, at (x,y) coordinates (10,4) and (10,5), have a respective capacitive touch amplitudes (i.e., 204 and 255) above the average capacitive touch amplitude (i.e., 60). According to various examples, these nodes 510, 520 having second touch data greater than the average first touch data represent a peak of the second touch, and are re-allocated to the second touch. According to various examples, the respective re-allocated nodes may have respective first touch data during the cycle N−1 that is less than the average first touch data, and respective second touch data during cycle N that is greater than the average first touch data. According to various examples, the re-allocated nodes may be based on the second touch data of the respective one or more boundary nodes being greater than the first touch data of the respective one or more boundary nodes. According to various examples, one or more boundary nodes having second touch data that exceeds the respective first touch data for the respective one more boundary nodes by a threshold, may be re-allocated to the second touch. For example, regardless of the average first touch data, if the touch data of a boundary node increases by, for example, a factor of two, the boundary node may be re-allocated from the first touch the second touch.

Figure 6:
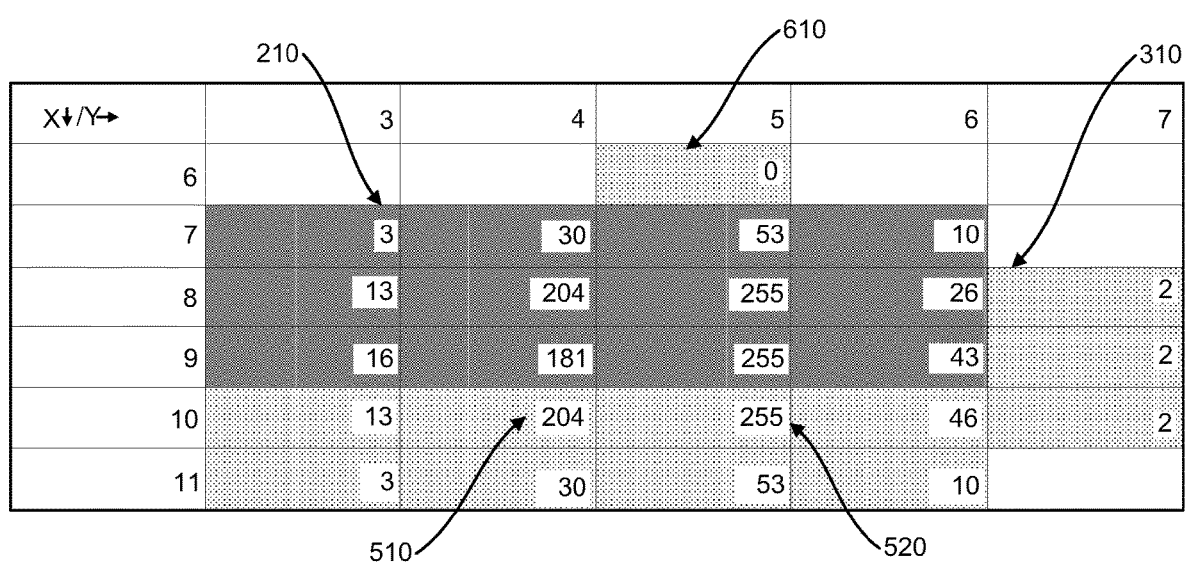
FIG. 6 shows a method of re-allocating boundary nodes of a capacitive touch screen between first and second touches based on capacitive touch data according to various examples.
Figure 7:
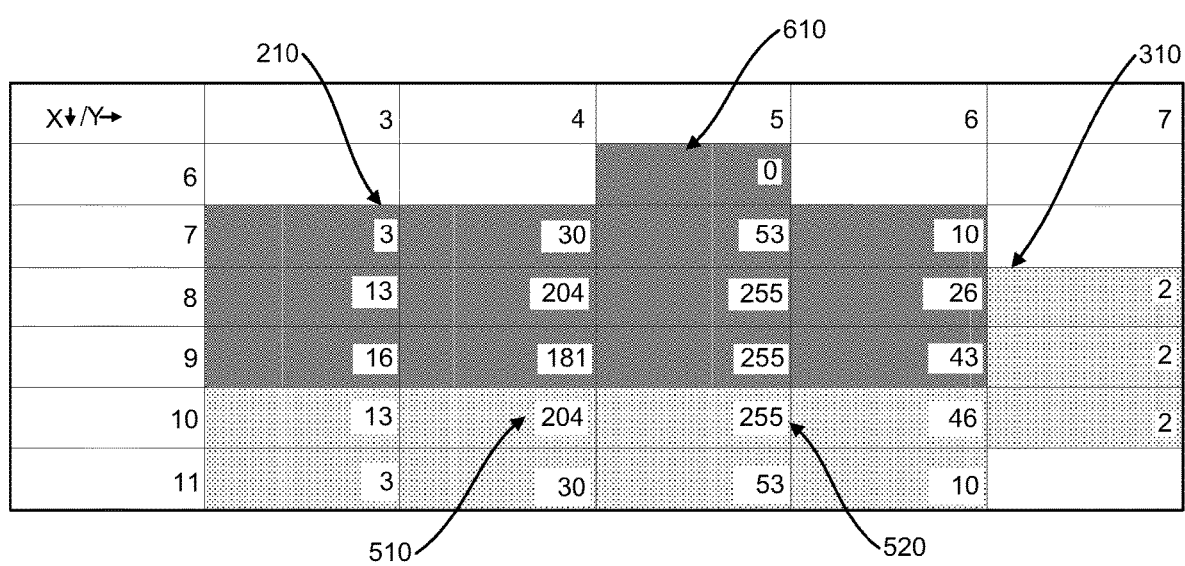
FIG. 7 shows a method of re-allocating isolated nodes of a capacitive touch screen from the second touch to the first touch based on capacitive touch data according to various examples.

As shown in FIG. 6, the two re-allocated boundary nodes 510, 520, located at coordinates (10,4) and (10,5), have been re-allocated to the second touch. Step 207 includes identifying any isolated nodes allocated to the second touch and re-allocating such isolated nodes to the first touch. FIG. 6 illustrates the step of identifying isolated nodes, according to various examples. Referring to FIG. 6, an isolated node 610 may be identified as a node allocated to the second touch that is not adjacent to or touching any other node allocated to the second touch. For example, node (6,5) is allocated to the second touch (with touch data of zero), but is not adjacent to or touching any other node allocated to the second touch, and is therefore identified as an isolated node 610. According to various examples, isolated nodes of the second touch may be re-allocated to the first touch, as shown in FIG. 7, in which isolated node 610, located at coordinates (6,5) has been re-allocated to the first touch.

Figure 8:
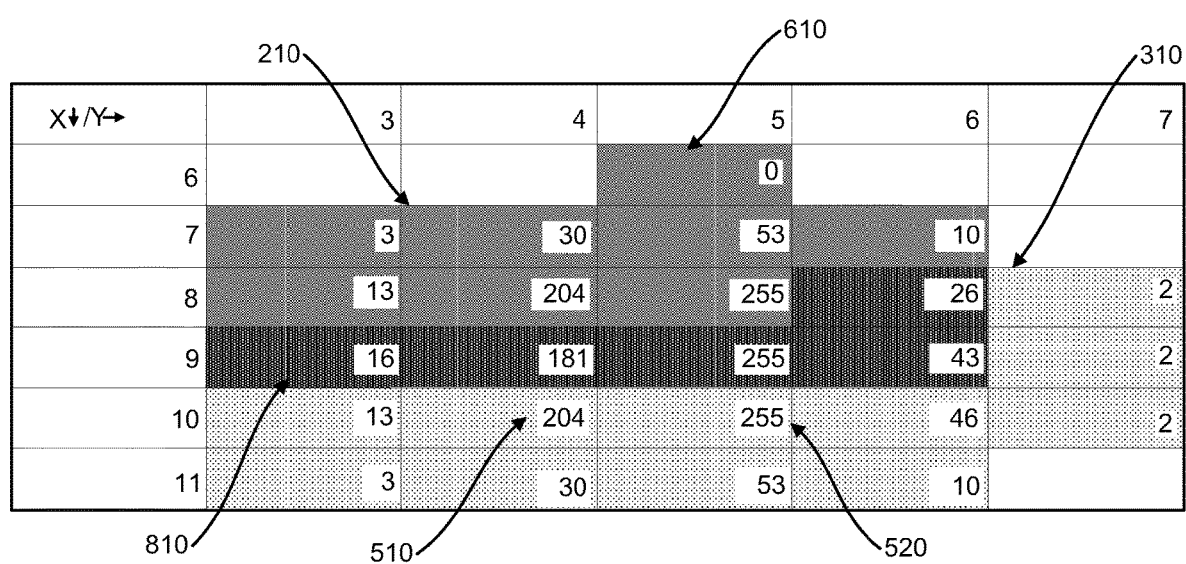
FIG. 8 shows a method of identifying joint boundary nodes of a capacitive touch screen between first and second touches based on capacitive touch data according to various examples.

FIG. 8 shows a method of identifying joint boundary nodes of a capacitive touch screen between first and second touches based on capacitive touch data according to various examples. To identify joint boundary nodes, according to various examples, first total touch data may be determined by calculating the sum of the respective first touch data during the cycle N−1 of each node allocated to the first touch, as described above in step 201 of FIG. 2A. For example, the sum of the respective first touch data (e.g., capacitive touch amplitudes) in cycle N−1 shown for the nodes 210 in FIG. 2 is 838. Next, in step 208a of FIG. 2A, a second total touch data may be calculated by calculating the sum of the respective second touch data during the cycle N for each node allocated to the first touch. The nodes used for determining the second total touch data may be determined after boundary nodes and isolated nodes, if any, are re-allocated. For example, as shown in FIG. 5, nodes (10,4) and (10,5) are identified as boundary nodes 510, 520, which are re-allocated to the second touch in FIG. 6. Similarly, in FIG. 6, node (6,5) is identified as an isolated node 610, and is re-allocated to the first touch in FIG. 7. According to various examples, once these re-allocation steps have occurred, the second total touch data may be calculated by, for example, summing the capacitive touch amplitudes during the cycle N of the nodes allocated to the first touch, which are shown in green in FIG. 7. Calculating the second total touch data for the nodes shown in green in FIG. 7 yields a second total touch data of 1089.

Once the first and second total touch data are calculated, in step 208b of FIG. 2A the two values may be compared to determine whether the total touch data allocated to the first touch has increased beyond a certain threshold from the cycle N−1 to the cycle N, i.e. from the first cycle to the second cycle. For example, if the second total touch data exceeds the first total touch data by more than 10%, it may be determined that at least part of the increase in total touch data is caused by the second touch. Although this example uses an increase of more than 10% as a threshold, a different threshold may be used. For example, the threshold may be set at a single unit of the total touch data (e.g., the sum of the respective capacitive touch amplitudes), i.e. a threshold of "1", such that any increase in total touch data from the first cycle to the second cycle may indicate that at least part of the increase in total touch data is caused by the second touch. In step 209 of FIG. 2A, if the second total touch data exceeds the first total touch data by more than the threshold, the boundary nodes allocated to the first touch (i.e., the nodes allocated to the first touch that are adjacent to nodes allocated to the second touch) may be designated as joint boundary nodes 810, which are allocated to both the first touch and the second touch. If the second total touch data does not exceed the first total touch data by more than the threshold, the boundary nodes allocated to the second touch (i.e., the nodes allocated to the second touch that are adjacent to nodes allocated to the first touch) may be designated as joint boundary nodes, which are allocated to both the first touch and the second touch.

Figure 9:
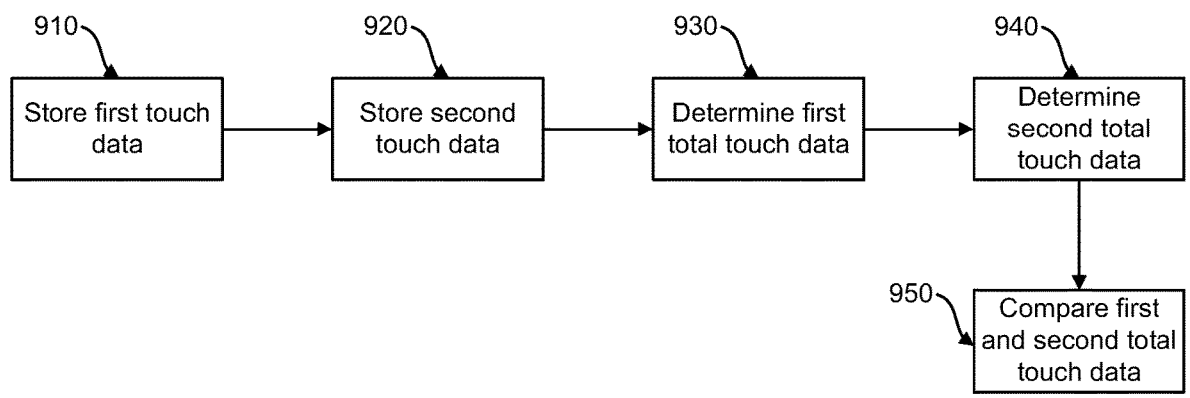
FIG. 9 shows a method of detecting an application or removal of one of a first touch and a second touch according to various examples.

According to various examples, a new touch of the capacitive touch screen may detected. In addition, a "lift off" or removal of a touch that has been physically merged with another touch can be detected. For example, FIG. 9 shows a method of detecting an application or removal of one of a first touch and a second touch according to various examples. In step 910 first touch data for a first set of nodes at a cycle N−1 may be stored. The first touch data may be capacitive touch amplitude, although other types of touch data that is able to indicate a touch may be used. The touch data for respective nodes in the first set of nodes may be stored, however, other touch data for the first set of nodes, such as, without limitation, an average value or total value of all nodes may be used instead of or in addition to storing touch data for respective nodes. According to various examples, in step 920 second touch data may be stored for a second set of nodes at a cycle N, where cycle N is after cycle N−1, and may be called a second cycle. The second set of nodes may at least partially overlap with the first set of nodes. The method according to various examples may determine, in step 930, first total touch data by summing the respective first touch data of respective nodes of the first set of nodes. The method according to various examples may also determine, in step 940, second total touch data by summing the respective second touch data of respective nodes of the second set of nodes. The method according to various examples may, in step 950, compare the first total touch data to the second total touch data, and determine whether a touch has been applied or removed based on the result of the comparison. For example, if the second total touch data divided by the first total touch data is greater than a certain threshold, it may be determined that a new touch has been detected. If the first total touch data divided by the second total touch data is greater than a certain threshold, it may be determined that a touch has been removed.

Figure 10A:
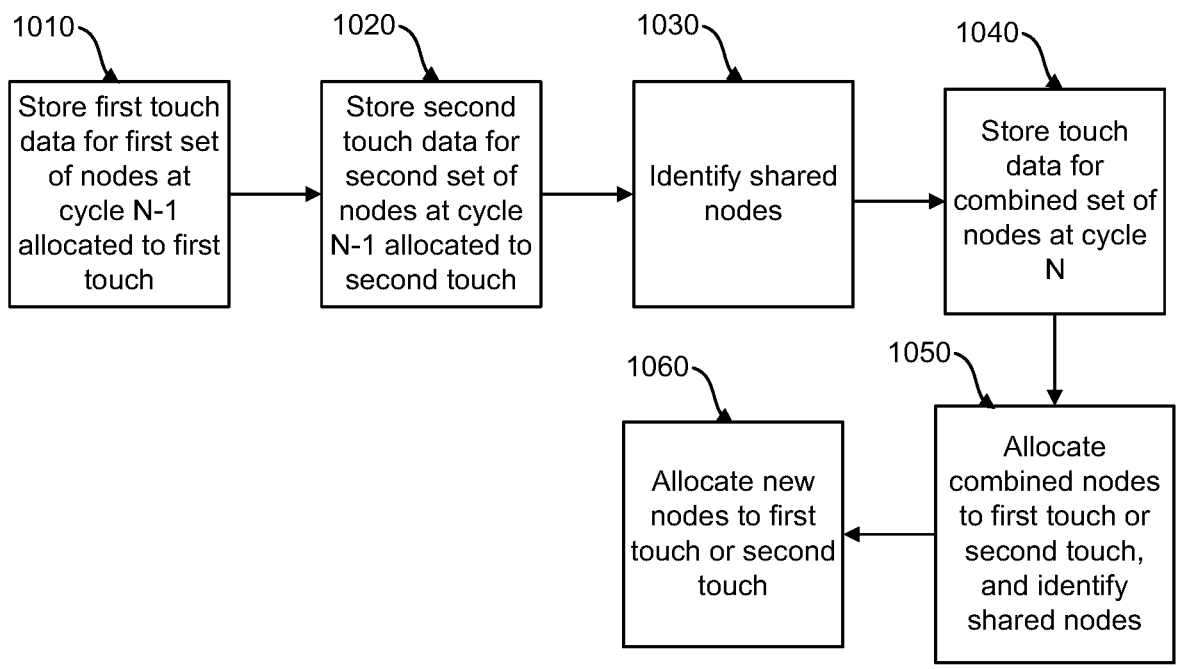
FIG. 10A shows a method of distinguishing between touches on a capacitive touch screen according to various examples.
Figure 10B:
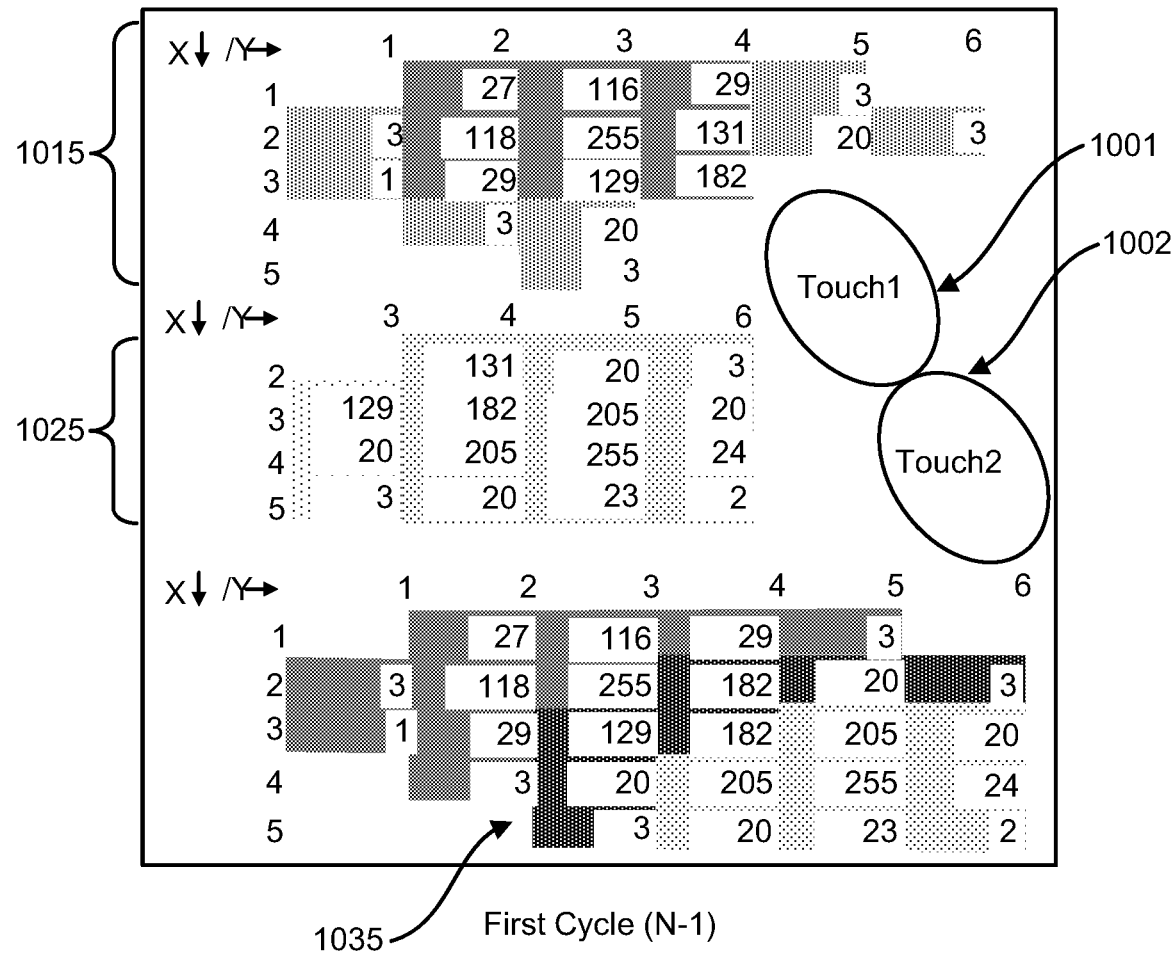
FIGS. 10B and 10C show a graphical representation of capacitive touch data corresponding to the method of FIG. 10A according to various examples.
Figure 10C:
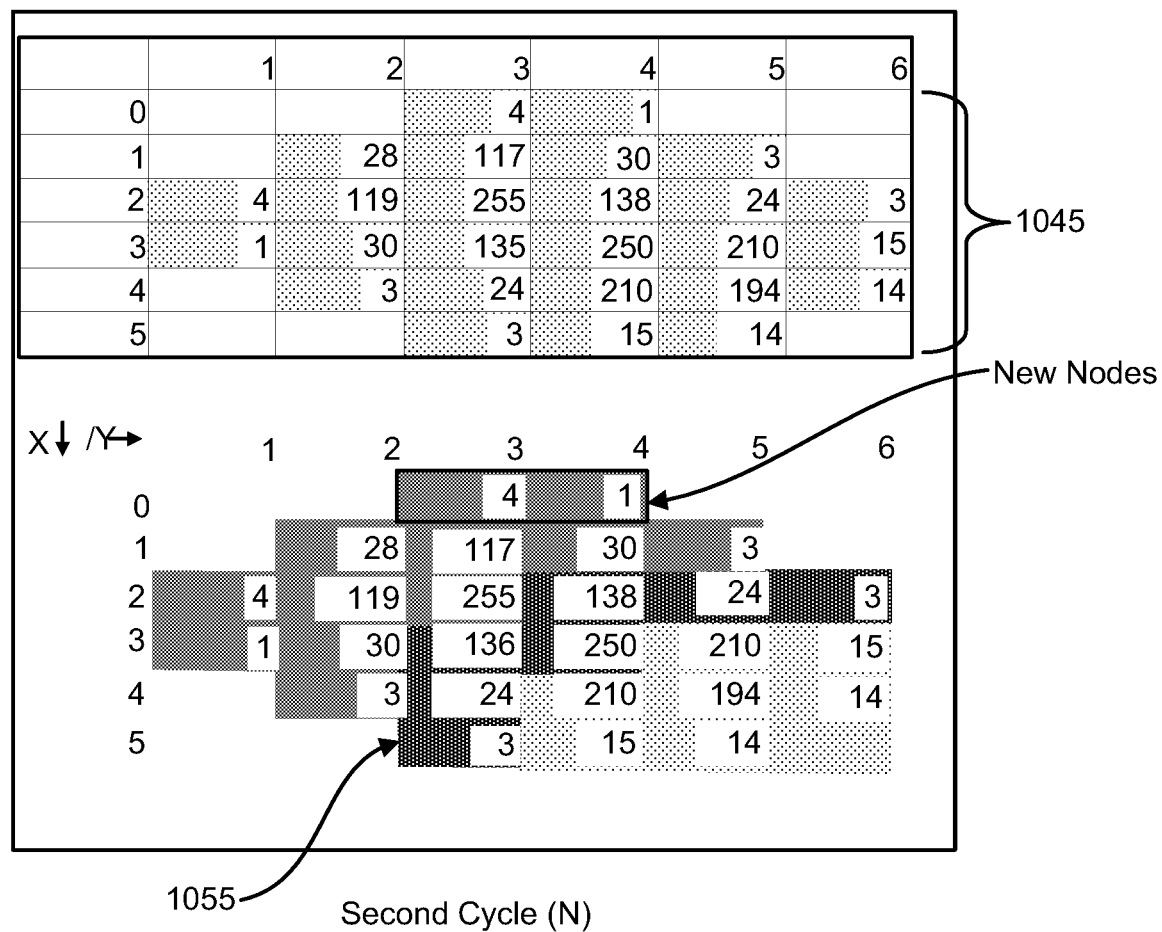

FIG. 10A shows a method of distinguishing between touches on a capacitive touch screen according to various examples, and FIGS. 10B-10C show a graphical representation of capacitive touch data corresponding to the method of FIG. 10A according to various examples. For example, during a "pinch" operation, in which a user is moving two fingers closer together on the capacitive touch screen, it may be difficult to distinguish between a first touch 1001 of one finger and a second touch 1002 of a second finger. Referring to FIGS. 10A-10C, the method may include a step 1010 of storing respective first touch data at a first cycle, i.e. cycle N−1, for a first set of nodes 1015 of the capacitive touch screen that are allocated to the first touch 1001. The method may include a step 1020 of storing respective second touch data at the first cycle, i.e. cycle N−1, for a second set of nodes 1025 of the capacitive touch screen that are allocated to the second touch 1002. The method may include a step 1030 of identifying as shared nodes 1035 of the first cycle, nodes of the capacitive touch screen allocated to the first touch 1001 and the second touch 1002.

The method may include a step 1040 of storing respective touch data for a combined set of nodes 1045 of the capacitive touch screen at a second cycle, i.e. cycle N, that occurs after the first cycle. The combined set of nodes 1045 may at least partially overlap at least one of the first set of nodes 1015 and the second set of nodes 1025. The method may include a step 1050 of allocating nodes of the combined set of nodes 1045 that overlap with the first set of nodes 1015 to the first touch, allocating nodes of the combined set of nodes 1045 that overlap with the second set of nodes 1025 to the second touch, and identifying as shared nodes 1055 of the second cycle, nodes of the combined set of nodes 1045 that overlap with the shared nodes 1035 of the first cycle.

According to various examples, storing respective touch data for a combined set of nodes may include storing touch data for new nodes, for which touch data was not stored in the first cycle. For example, in the second cycle of FIG. 10C, touch data was recorded for nodes (0,3) and (0,4), but touch data was not recorded for these nodes in the first cycle. Step 1060 of the method may include allocating nodes of the combined set of nodes 1045 that do not overlap with the first set of nodes 1015 or the second set of nodes 1025, but are adjacent to one or more nodes of the first set of nodes 1015, to the first touch. For example, because nodes (0,3) and (0,4) are adjacent to one or more nodes of the first set of nodes (e.g., nodes (1, 3) and (1,4)), nodes (0,3) and (0,4) are allocated to the first set of nodes 1015. Similarly, the method may include allocating nodes of the combined set of nodes that do not overlap with the first set of nodes or the second set of nodes, but are adjacent to one or more nodes of the second set of nodes, to the second touch.

Figure 10D:
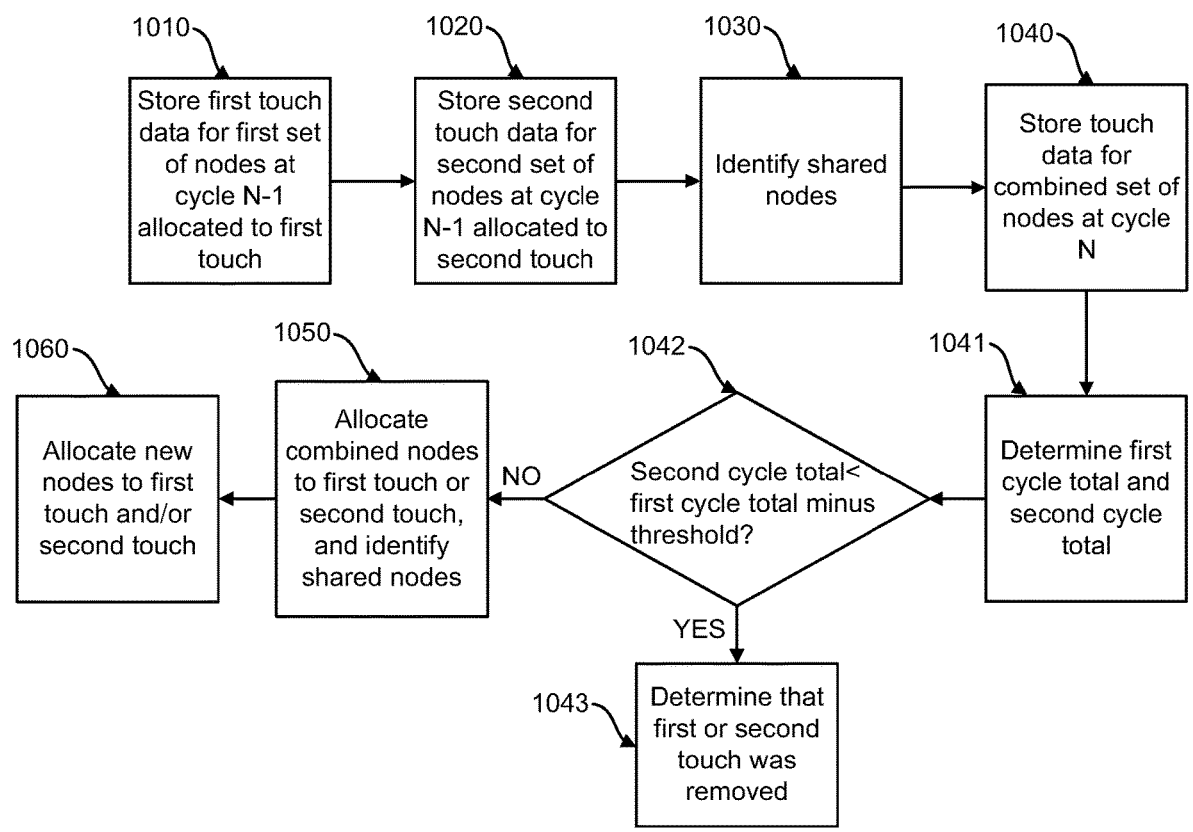
FIG. 10D shows a method of distinguishing between touches on a capacitive touch screen, and determining whether a touch has been removed, according to various examples.

FIG. 10D shows a method of distinguishing between touches on a capacitive touch screen, and determining whether a touch has been removed, according to various examples. The method of FIG. 10D contains the same steps as the method of FIG. 10A, and discussion of those steps will not be repeated. The method of FIG. 10D also includes a step 1041 of determining a first cycle total by summing the respective first touch data for the respective first set of nodes 1015 at the first cycle and the respective second touch data for the respective second set of nodes 1025 at the first cycle. A second cycle total may be determined by summing the respective touch data for the combined set of nodes 1045 of the capacitive touch screen at a second cycle, and the first cycle total may be compared to the second cycle total. The method may include a step 1042 of determining whether the second cycle total is less than the first cycle total minus a threshold. In step 1043, it is determined that one of the first touch and the second touch has been removed, in response to the second cycle total being less than the first cycle total minus the threshold. According to various examples, the step 1050 of allocating nodes of the combined set of nodes to the first and second touch, and the step 1060 of identifying shared nodes of the second cycle are performed in response to the second cycle total not being less than the first cycle total minus the threshold.

Figure 11:
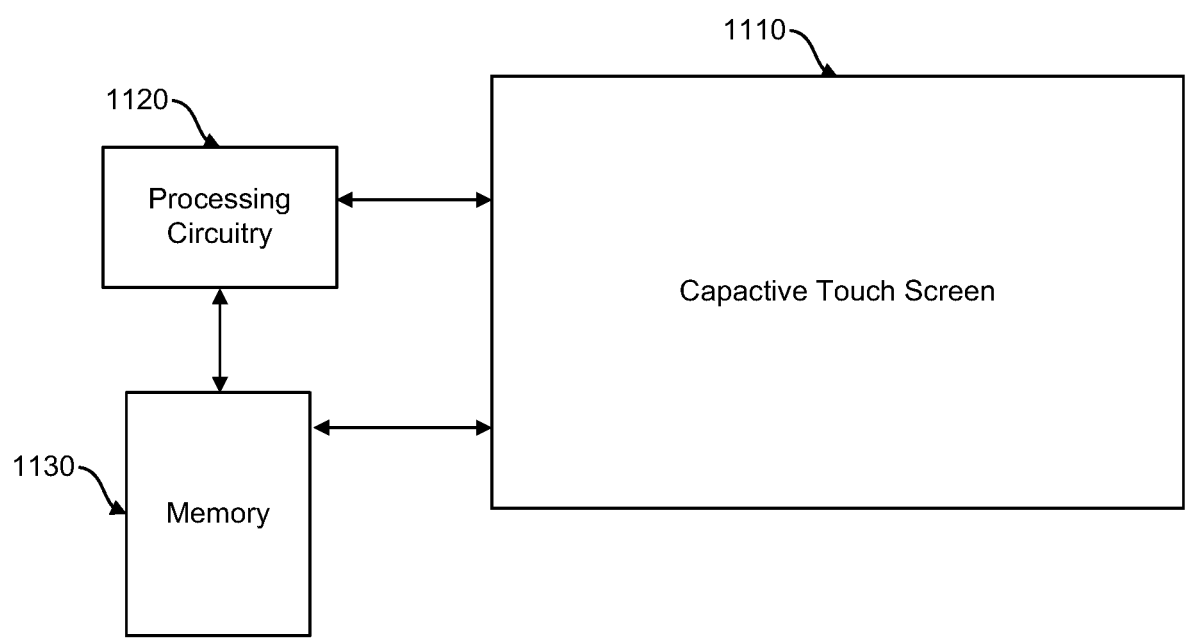
FIG. 11 shows a block diagram of an apparatus to distinguish between touches on a capacitive touch screen according to various examples.

FIG. 11 shows a block diagram of an apparatus to distinguish between touches on a capacitive touch screen according to various examples. The apparatus may include a capacitive touch screen 1110, processing circuitry 1120 that is coupled to the capacitive touch screen 1110, and a memory unit coupled to the processing circuitry 1120 and the capacitive touch screen 1110. The processing circuitry 1120 may include a capacitive touch controller, and may be able to receive input signals from the capacitive touch screen 1110, and may execute software to perform the methods described above. The memory unit 1130 may be used to store touch data received from the capacitive touch screen 1110, as well as data calculated by the processing circuitry 1120, such as total touch screen data for set of nodes at a given cycle.

The capacitive touch screen 1110 may have a plurality of nodes to output respective capacitance changes in response to being touched by a user, or in response to the user coming within sufficient proximity to the capacitive touch screen 1110. The processing circuitry 1120 measures a capacitive touch amplitude at each of the nodes that are touched to determine the touch data based on capacitance changes. The memory unit 1130 may be coupled to the capacitive touch screen 1110. The processing circuitry 1120 may store, in the memory unit 130, respective first touch data for a first set of nodes of the plurality of nodes of the capacitive touch screen 1110 at a first cycle, and determine a first total touch data by summing the respective first touch data for the first set of nodes at the first cycle. The processing circuitry 1120 may store, in the memory unit 1130, respective second touch data for a second set of nodes of the plurality of nodes at a second cycle after the first cycle. The first set of nodes and the second set of nodes may at least partially overlap. The processing circuitry 1120 may allocate nodes for which first touch data was stored at the first cycle to a first touch, allocate nodes for which second touch data was stored at the second cycle, but for which first touch data was not stored at the first cycle, to a second touch, and determine, for one or more boundary nodes of the first set of nodes allocated to the first touch that are adjacent to a node allocated to the second touch, whether the second touch data of the respective one or more boundary nodes is greater than the first touch data of the respective one or more boundary nodes. The processing circuitry may re-allocate one or more of the respective boundary nodes to the second touch based on the second touch data of the respective one or more boundary nodes being greater than the first touch data of the respective one or more boundary nodes.

The processing circuitry 1120 may identify one or more isolated nodes allocated to the second touch that are adjacent to at least one other node allocated to the first touch, and not adjacent to any other nodes allocated to the second touch, and re-allocate the one or more identified isolated nodes to the first touch. After the one or more isolated nodes is reallocated to the first touch, and after the one or more boundary nodes is re-allocated to the second touch, the processing circuitry 1120 may determine a second total touch data by summing respective second touch data from the second cycle for nodes allocated to the first touch, compare the first total touch data to the second total touch data, and identify joint boundary nodes based on the comparison of the first total touch data to the second total touch data.

Various examples have been disclosed herein, in connection with the above description and the drawings. It will be understood that it would be unduly repetitious to literally describe and illustrate every combination and subcombination of these examples. For example, methods described herein may include more, fewer, or other steps. Additionally, steps may be performed in any suitable order and may be combined with other steps. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method of distinguishing between touches on a capacitive touch screen, the method comprising:
   storing respective first touch data for a first set of nodes at a first cycle;
   determining a first total touch data by summing the respective first touch data for the first set of nodes at the first cycle;
   storing respective second touch data for a second set of nodes at a second cycle after the first cycle, wherein the first set of nodes and the second set of nodes at least partially overlap;
   allocating nodes for which first touch data was stored at the first cycle to a first touch;
   allocating nodes for which second touch data was stored at the second cycle, but for which first touch data was not stored at the first cycle, to a second touch;
   determining, for one or more boundary nodes of the first set of nodes allocated to the first touch that are adjacent to a node allocated to the second touch, whether the second touch data of the respective one or more boundary nodes is greater than the first touch data of the respective one or more boundary nodes;
   re-allocating one or more of the respective boundary nodes to the second touch based on the second touch data of the respective one or more boundary nodes being greater than the first touch data of the respective one or more boundary nodes;
   identifying one or more isolated nodes allocated to the second touch that are adjacent to at least one other node allocated to the first touch, and not adjacent to any other nodes allocated to the second touch, and re-allocating the one or more identified isolated nodes to the first touch;
   after the one or more isolated nodes is reallocated to the first touch, and after the one or more boundary nodes is re-allocated to the second touch, determining a second total touch data by summing respective second touch data from the second cycle for nodes allocated to the first touch;
   comparing the first total touch data to the second total touch data; and
   identifying joint boundary nodes based on the comparison of the first total touch data to the second total touch data.

2. The method of claim 1, wherein the step of identifying joint boundary nodes includes, in response to the second total touch data exceeding the first total touch data by a threshold, identifying one or more nodes allocated to the first touch that are adjacent to a node allocated to the second touch as the joint boundary nodes.

3. The method of claim 1, wherein the step of identifying joint boundary nodes includes, in response to the second total touch data not exceeding the first total touch data by a threshold, identifying one or more nodes allocated to the second touch that are adjacent to a node allocated to the first touch as the joint boundary nodes.

4. The method of claim 1, wherein the step of re-allocating one or more of the boundary nodes comprises:
   determining a first touch data average of the first touch data for the first set of nodes at the first cycle;
   comparing respective second touch data stored at the second cycle for the respective one or more boundary nodes to the first touch data average; and
   re-allocating to the second touch one or more boundary nodes having first touch data that is less than the first touch data average and second touch data that is greater than the first touch data average.

5. The method of claim 1, wherein the step of re-allocating one or more of the boundary nodes comprises:
   determining whether the respective second touch data of the one or more boundary nodes exceeds the respective first touch data of the respective one or more boundary nodes by more than a threshold; and
   re-allocating to the second touch one or more boundary nodes having second touch data that exceeds the respective first touch data average by more than the threshold.

6. The method of claim 1, wherein the first touch data and the second touch data comprise at least one of capacitive touch distribution, location and amplitude.

7. A method of detecting an application or removal of one of a first touch and a second touch on a capacitive touch screen, the method comprising:
   storing respective first touch data for a first set of nodes at a first cycle;
   storing respective second touch data for a second set of nodes at a second cycle after the first cycle;
   determining a first total touch data by summing the respective first touch data for the first set of nodes at the first cycle;
   determining a second total touch data by summing the respective second touch data for the second set of nodes at the second cycle; and
   determining whether a touch has been applied or removed from the capacitive touch screen based on a comparison between the first total touch data and the second total touch data.

8. The method of claim 7, wherein in response to the second total touch data divided by the first total touch data exceeding a threshold, determining that a touch has been applied to the capacitive touch screen.

9. The method of claim 7, wherein in response to the first total touch data divided by the second total touch data exceeding a threshold, determining that a touch has been removed from the capacitive touch screen.

10. A method of distinguishing between touches on a capacitive touch screen, the method comprising:
storing respective first touch data for a first set of nodes of the capacitive touch screen at a first cycle, wherein the first set of nodes are allocated to a first touch;
storing respective second touch data for a second set of nodes of the capacitive touch screen at a first cycle, wherein the second set of nodes are allocated to a second touch;
identifying as shared nodes of the first cycle, nodes of the capacitive touch screen allocated to the first touch and the second touch;
storing respective touch data for a combined set of nodes of the capacitive touch screen at a second cycle, wherein the combined set of nodes at least partially overlaps at least one of the first set of nodes and the second set of nodes;
allocating nodes of the combined set of nodes that overlap with the first set of nodes at the first cycle to the first touch;
allocating nodes of the combined set of nodes that overlap with the second set of nodes at the first cycle to the second touch; and
identifying as shared nodes of the second cycle, nodes of the combined set of nodes that overlap with the shared nodes of the first cycle.

11. The method of claim 10, comprising:
allocating nodes of the combined set of nodes that do not overlap with the first set of nodes at the first cycle or the second set of nodes at the first cycle, but are adjacent to one or more nodes of the first set of nodes at the first cycle, to the first touch; and
allocating nodes of the combined set of nodes that do not overlap with the first set of nodes or the second set of nodes at the first cycle, but are adjacent to one or more nodes of the second set of nodes, to the second touch.

12. The method of claim 10, comprising:
determining a first cycle total by summing the respective first touch data for the respective first set of nodes at the first cycle and the respective second touch data for the respective second set of nodes at the first cycle;
determining a second cycle total by summing the respective touch data for a combined set of nodes of the capacitive touch screen at a second cycle;
comparing the first cycle total to the second cycle total; and
determining that one of the first touch and the second touch has been removed, in response to the second cycle total being less than the first cycle total.

13. The method of claim 12, wherein the steps of allocating nodes of the combined set of nodes to the first and second touch, and the step of identifying shared nodes of the second cycle are performed in response to the second cycle total being not less than the first cycle total minus a threshold.

14. An apparatus to distinguish between touches on a capacitive touch screen, the apparatus comprising:
a capacitive touch screen having a plurality of nodes to output respective touch data in response to being touched by a user;
a memory unit coupled to the capacitive touch screen; and
processing circuitry to:
store, in the memory unit, respective first touch data for a first set of nodes of the plurality of nodes at a first cycle;
determine a first total touch data by summing the respective first touch data for the first set of nodes at the first cycle;
store, in the memory unit, respective second touch data for a second set of nodes of the plurality of nodes at a second cycle after the first cycle, wherein the first set of nodes and the second set of nodes at least partially overlap;
allocate nodes for which first touch data was stored at the first cycle to a first touch;
allocate nodes for which second touch data was stored at the second cycle, but for which first touch data was not stored at the first cycle, to a second touch;
determine, for one or more boundary nodes of the first set of nodes allocated to the first touch that are adjacent to a node allocated to the second touch, whether the second touch data of the respective one or more boundary nodes is greater than the first touch data of the respective one or more boundary nodes;
re-allocate one or more of the respective boundary nodes to the second touch based on the second touch data of the respective one or more boundary nodes being greater than the first touch data of the respective one or more boundary nodes;
identify one or more isolated nodes allocated to the second touch that are adjacent to at least one other node allocated to the first touch, and not adjacent to any other nodes allocated to the second touch, and
re-allocate the one or more identified isolated nodes to the first touch;
after the one or more isolated nodes is reallocated to the first touch, and after the one or more boundary nodes is re-allocated to the second touch, determine a second total touch data by summing respective second touch data from the second cycle for nodes allocated to the first touch;
compare the first total touch data to the second total touch data; and
identify joint boundary nodes based on the comparison of the first total touch data to the second total touch data.

15. The apparatus of claim 14, wherein to identify the joint boundary nodes, in response to the second total touch data exceeding the first total touch data by a threshold, the processing circuitry is to identify one or more nodes allocated to the first touch that are adjacent to a node allocated to the second touch as the joint boundary nodes.

16. The apparatus of claim 14, wherein to identify the joint boundary nodes, in response to the second total touch data not exceeding the first total touch data by a threshold, the processing circuitry is to identify one or more nodes allocated to the second touch that are adjacent to a node allocated to the first touch as the joint boundary nodes.

17. The apparatus of claim 14, wherein to re-allocate the one or more boundary nodes, the processing circuitry is to:
determine a first touch data average of the first touch data for the first set of nodes at the first cycle;
compare respective second touch data stored at the second cycle for the respective one or more boundary nodes to the first touch data average; and
re-allocate to the second touch one or more boundary nodes having second touch data that is greater than the first touch data average.

18. The apparatus of claim 14, wherein to re-allocate the one or more boundary nodes, the processing circuitry is to:
   determine whether the respective second touch data of the one or more boundary nodes exceeds the respective first touch data of the respective one or more boundary nodes by more than a threshold; and
   re-allocate to the second touch one or more boundary nodes having second touch data that exceeds the respective first touch data average by more than the threshold.

19. The apparatus of claim 14, wherein the touch data comprises capacitive touch amplitude.

\* \* \* \* \*